(12) United States Patent
Kim et al.

(10) Patent No.: US 11,327,059 B2
(45) Date of Patent: May 10, 2022

(54) DIANHYDRIDE ANALYSIS METHOD

(71) Applicant: LG Chem, Ltd., Seoul (KR)

(72) Inventors: So Yeon Kim, Daejeon (KR); Joon Seok Lee, Daejeon (KR); Bumgyu Choi, Daejeon (KR); Byoung Hyoun Kim, Daejeon (KR)

(73) Assignee: LG Chem, Ltd.

( * ) Notice: Subject to any disclaimer, the term of this patent is extended or adjusted under 35 U.S.C. 154(b) by 140 days.

(21) Appl. No.: 16/958,365

(22) PCT Filed: Oct. 4, 2019

(86) PCT No.: PCT/KR2019/013062
§ 371 (c)(1),
(2) Date: Jun. 26, 2020

(87) PCT Pub. No.: WO2020/071868
PCT Pub. Date: Apr. 9, 2020

(65) Prior Publication Data
US 2021/0072203 A1    Mar. 11, 2021

(30) Foreign Application Priority Data

Oct. 5, 2018  (KR) .................. 10-2018-0119108

(51) Int. Cl.
*G01N 30/86* (2006.01)
*G01N 30/60* (2006.01)
(Continued)

(52) U.S. Cl.
CPC ......... *G01N 30/8631* (2013.01); *G01N 30/60* (2013.01); *G01N 30/88* (2013.01); *G01N 2030/027* (2013.01)

(58) Field of Classification Search
CPC .... G01N 30/8631; G01N 30/60; G01N 30/88; G01N 2030/027; G01N 2030/067; G01N 2030/884; G01N 30/06; G01N 30/74
See application file for complete search history.

(56) References Cited

U.S. PATENT DOCUMENTS

2010/0160578 A1   6/2010   Odle et al.

FOREIGN PATENT DOCUMENTS

| CN | 103969392 A | 8/2014 |
| CN | 108333269 A | 7/2018 |

(Continued)

OTHER PUBLICATIONS

Tasev, et al., "Optimization and validation of a derivatization method for analysis of biogenic amines in wines using RP-HPLC-DAD," Macedonian Journal of Chem. and Chem. Engineering, vol. 35, No. 1, pp. 19-28, DOI: 10.20450/mjcce.2016.884, publ. Jul. 4, 2016. (Year: 2016).*

(Continued)

*Primary Examiner* — Jennifer Wecker
*Assistant Examiner* — Michael Paul Shimek
(74) *Attorney, Agent, or Firm* — Lerner, David, Littenberg, Krumholz & Mentlik, LLP

(57) ABSTRACT

The present invention relates to a dianhydride analysis method. The method can stably analyze a dianhydride which has high reactivity and low solubility. Furthermore, the method can minimize the problem that a reaction product disturbs an analysis result, thereby improving accuracy of the analysis result.

19 Claims, 13 Drawing Sheets

(51) Int. Cl.
*G01N 30/88* (2006.01)
*G01N 30/02* (2006.01)

(56) References Cited

FOREIGN PATENT DOCUMENTS

| JP | S63016262 A | 1/1988 |
|---|---|---|
| JP | H05222195 A | 8/1993 |
| JP | H06300750 A | 10/1994 |
| JP | H09012543 A | 1/1997 |
| JP | 2002090355 A | 3/2002 |
| JP | 2002148254 A | 5/2002 |
| JP | 2003149221 A | 5/2003 |
| JP | 2004157081 A | 6/2004 |
| JP | 2006214819 A | 8/2006 |
| KR | 20100003408 A | 1/2010 |
| KR | 20150121460 A | 10/2015 |
| KR | 20180047229 A | 5/2018 |

OTHER PUBLICATIONS

Siggia, S. et al., "Determination of Carboxylic Acid Anhydrides in the Presence of Their Acids", Anal. Chem., vol. 23, No. 11, (1951). pp. 1717-1718.

Shimadzu, "Absorptiphotometric Intensity Detection Method," LC Talk Special Feature, vol. VII, (2017) 3 pgs.

General incorporated Electric Measuring Device, "5-2-6 Ultraviolet Absorbance Measuring Device (UV Measuring Device)", [online], 2018—, [27] Search on June Reiwa 3 (2021), pp. 02 to 06. html>. Internet <URL: https://www.jemima.or.jp/tech/5—[1, 2006.01] Retreived Jun. 27, 2021. 5 pgs.

General incorporated Electric Measuring Device, "5-2-6 Ultraviolet Absorbance Measuring Device (UV Measuring Device)", JEMIMA Japan Electric Measuring Instruments Industry, Online 2018, pp. 1-6, https://www.jemima.or.jp/tech/5-02-06.html.

Shimadzu, "Absorptiphotometric Intensity Detection Method," LC Talk Special Feature, 2017, p. 9, vol. 14.

Extended European Search Report for Application No. 19869173.5 dated Mar. 17, 2021, pp. 1-5.

Johnson JB, Funk GL. Determination of carboxylic acid anhydrides by reaction with morpholine. Analytical Chemistry. Sep. 1, 1955;27(9):1464-5.

Tashev K, Ivanova-Petropulos V, Stefova M. Optimization and validation of a derivatization method for analysis of biogenic amines in wines using RP-HPLC-DAD. Macedonian Journal of Chemistry and Chemical Engineering. Apr. 18, 2016;35(1):19-28.

International Search Report for PCT/KR2019/013062 dated Jan. 29, 2020; 2 pages.

* cited by examiner

[Fig. 1]
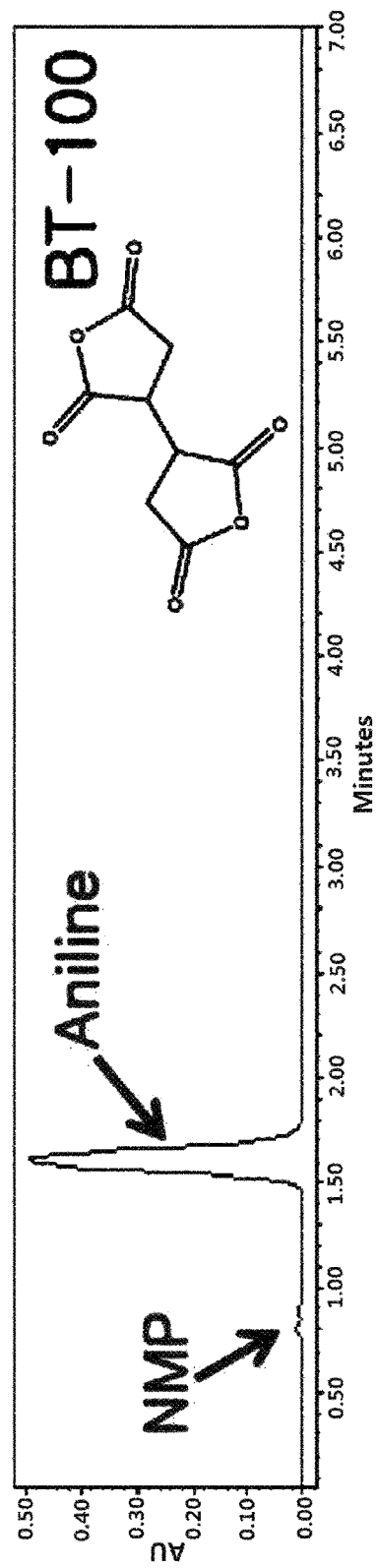

[Fig. 2]
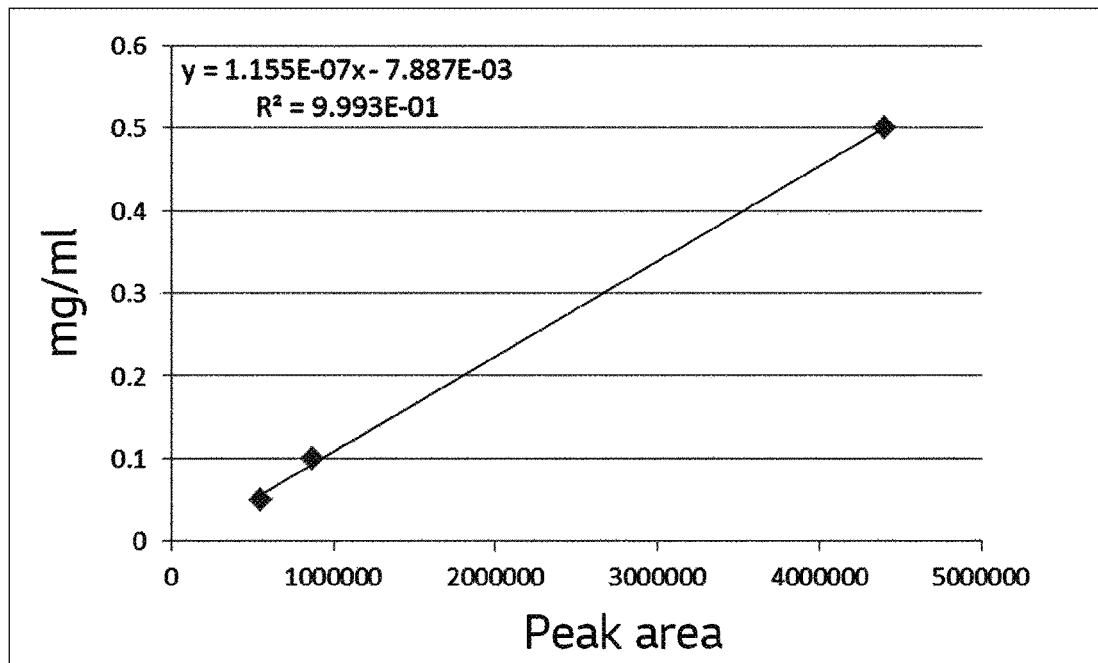

[Fig. 3]
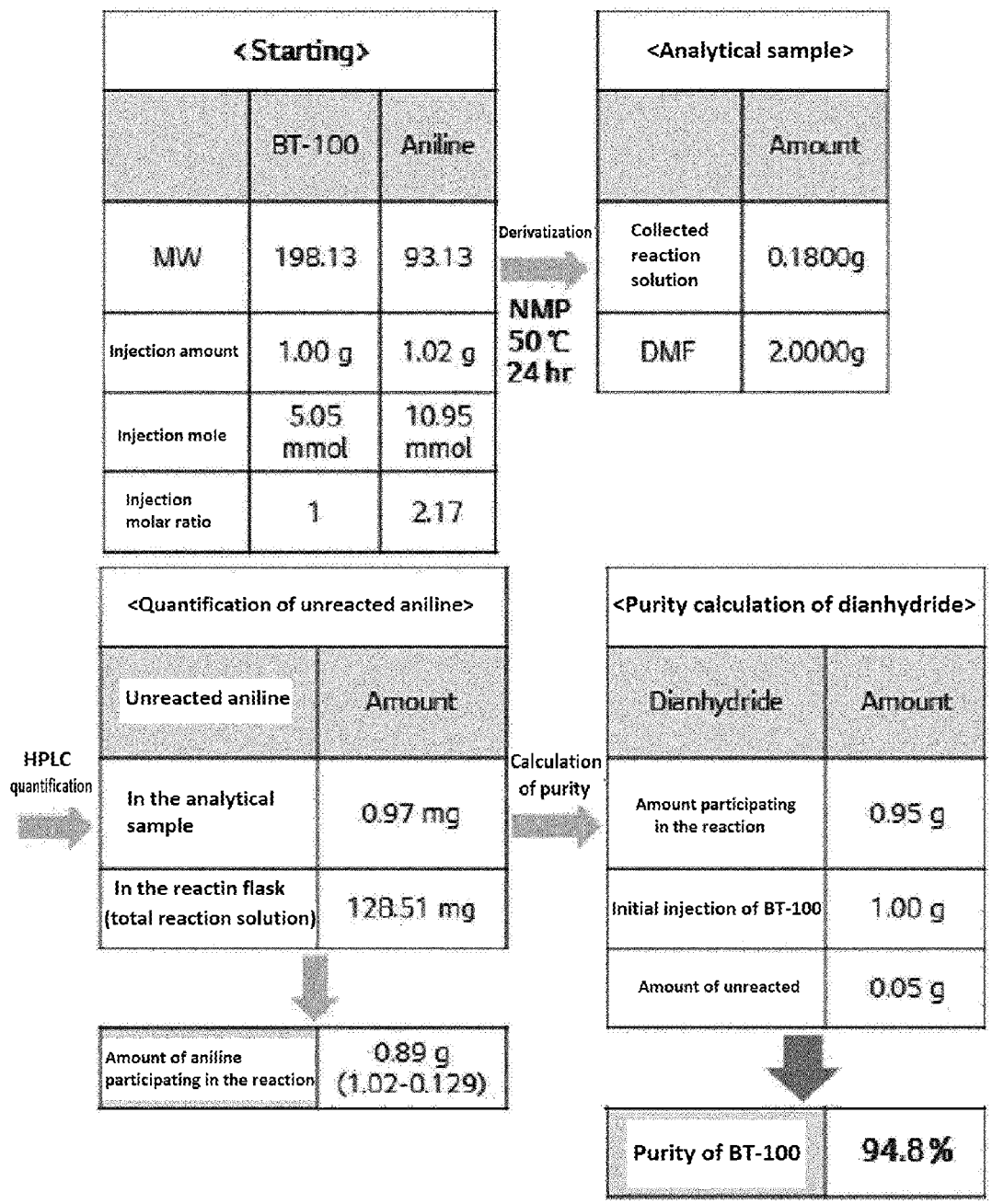

[Fig. 4]
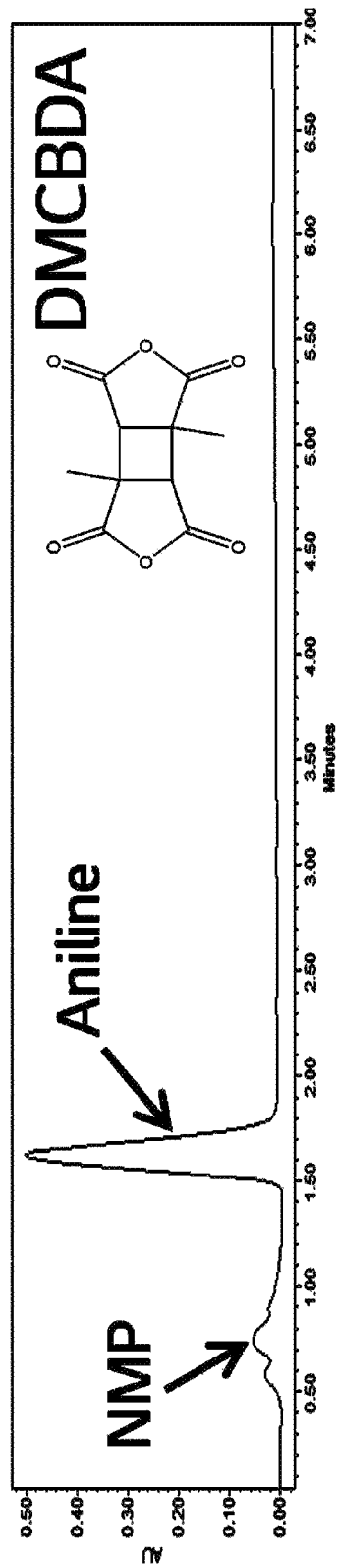

[Fig. 5]
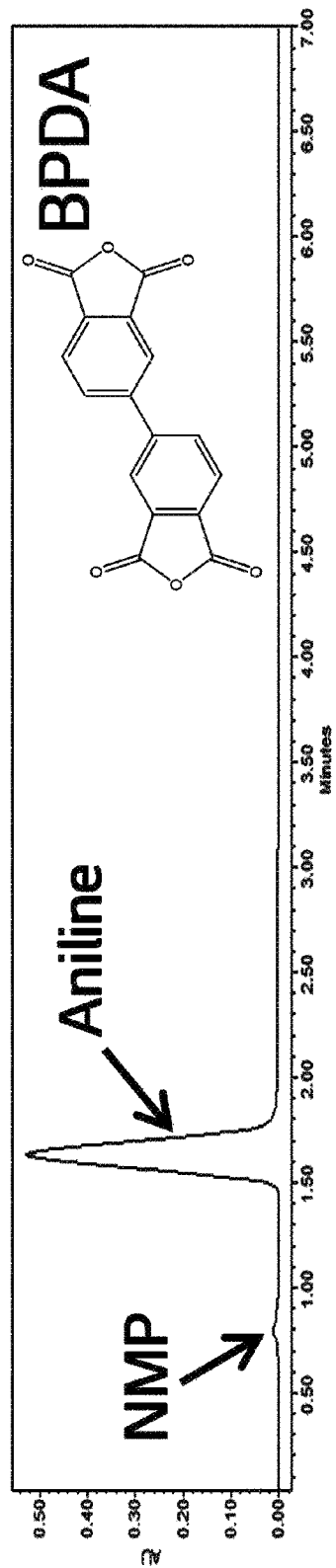

[Fig. 6]
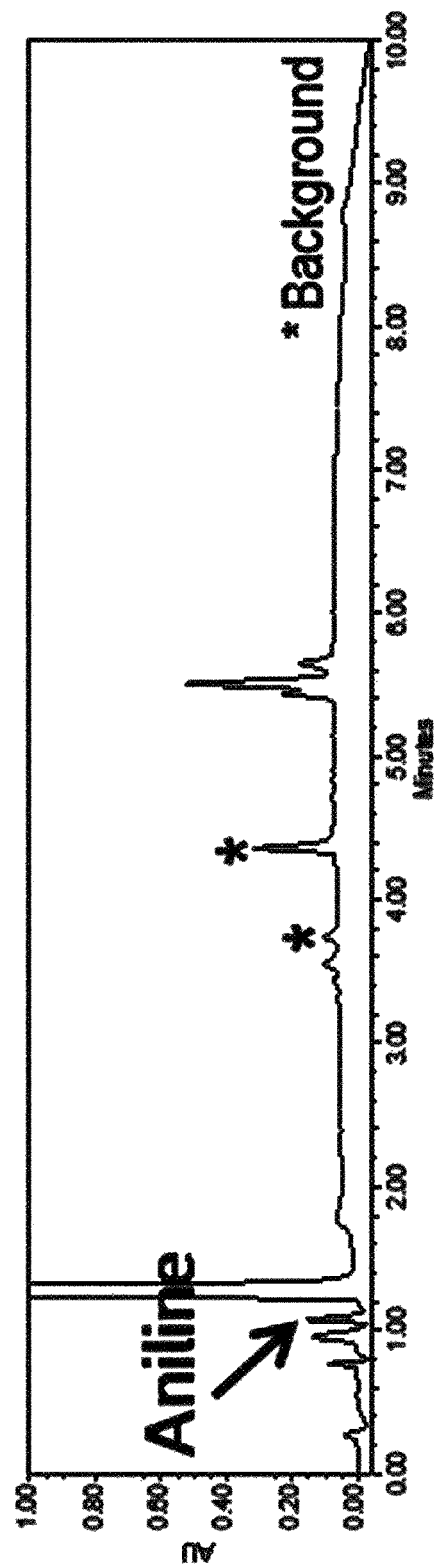

[Fig. 7]
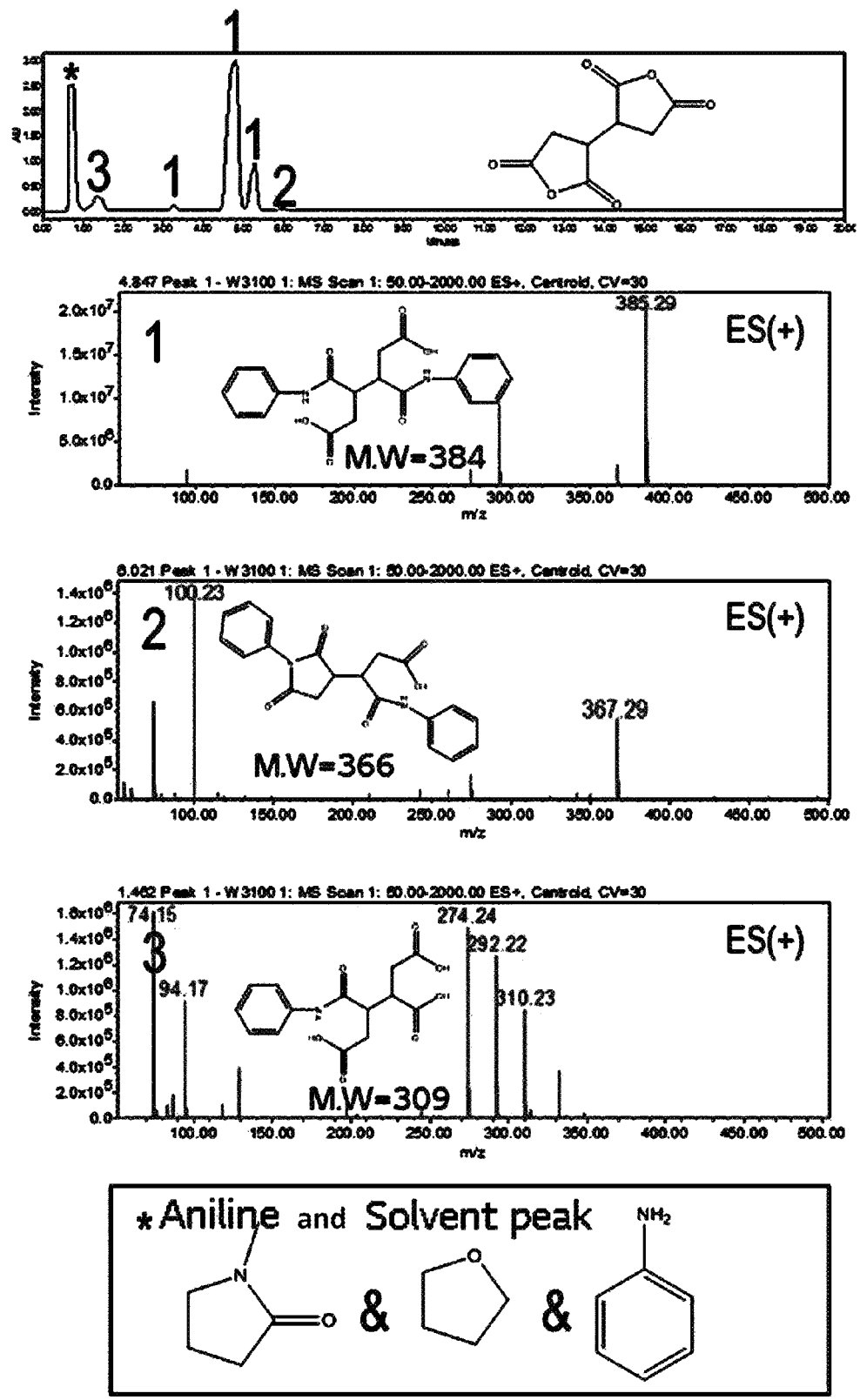

[Fig. 8]
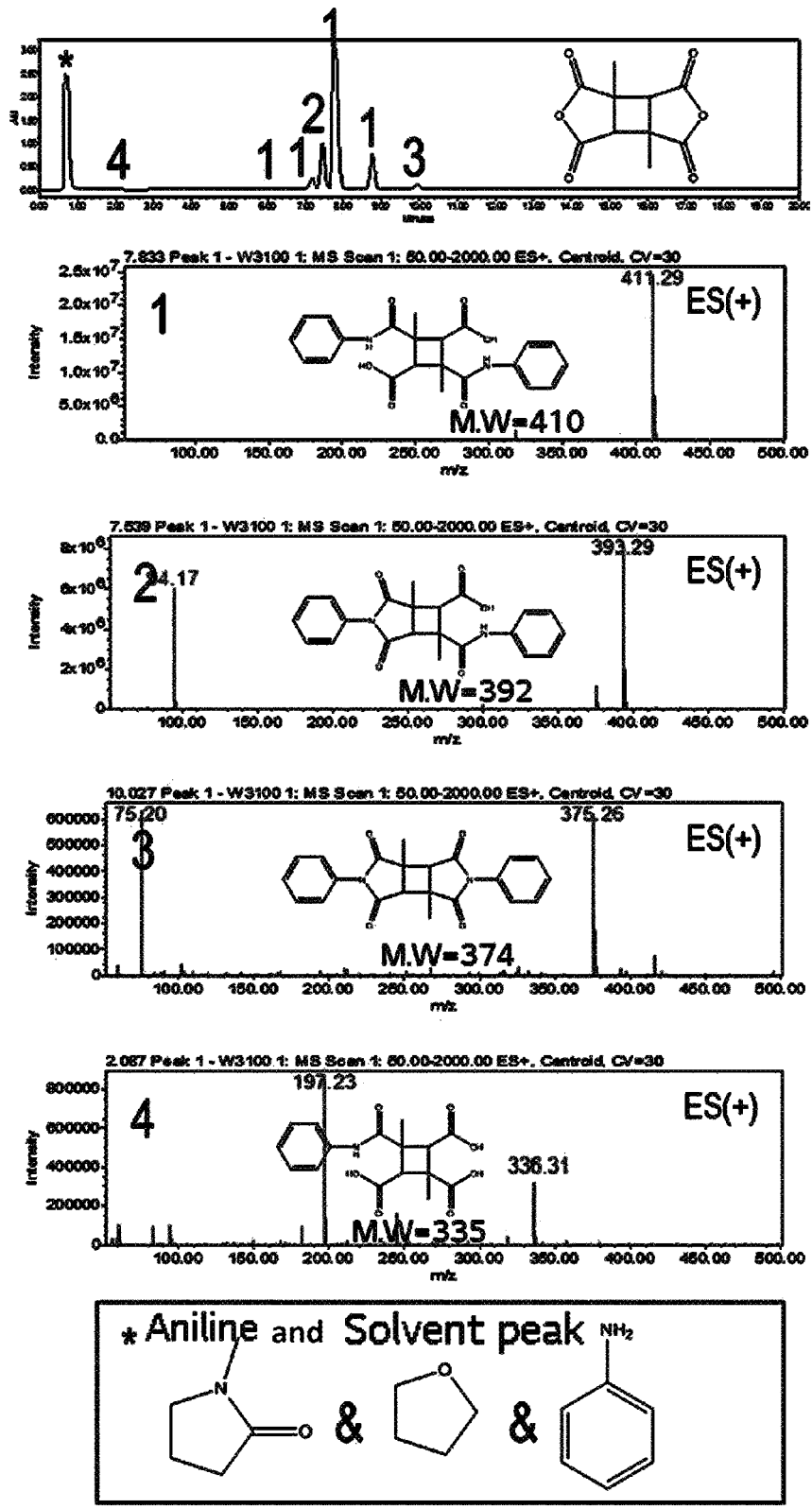

[Fig 9]
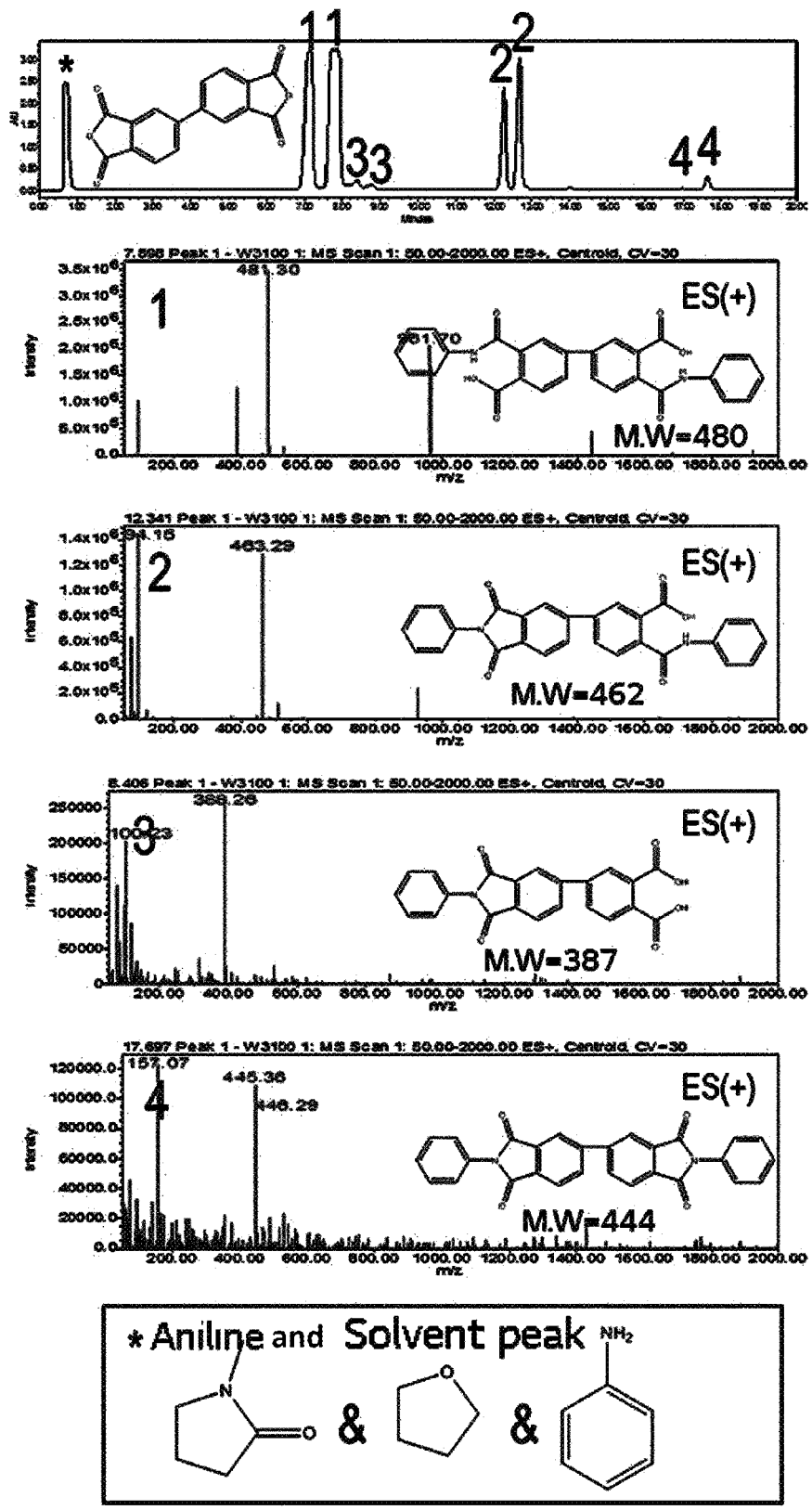

[Fig. 10]
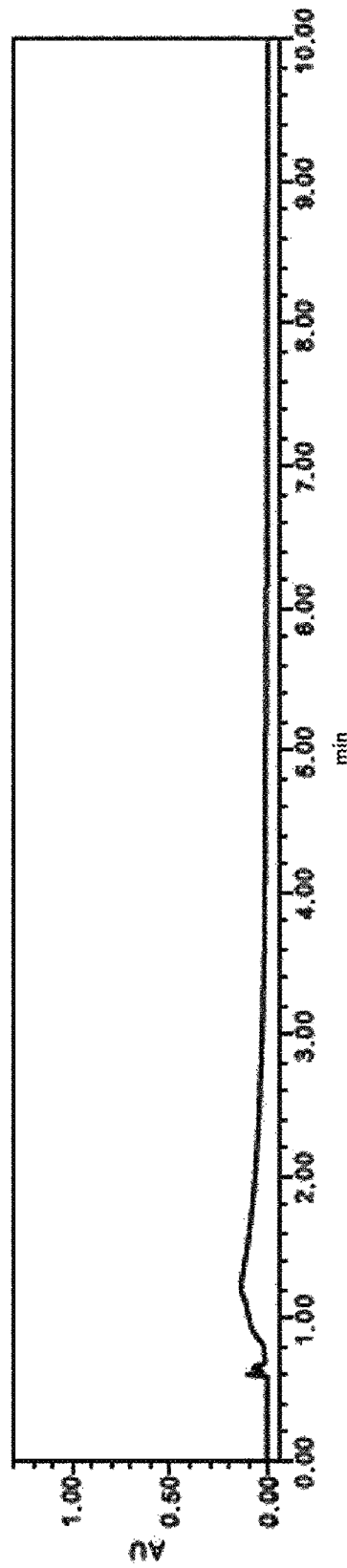

[Fig. 11]
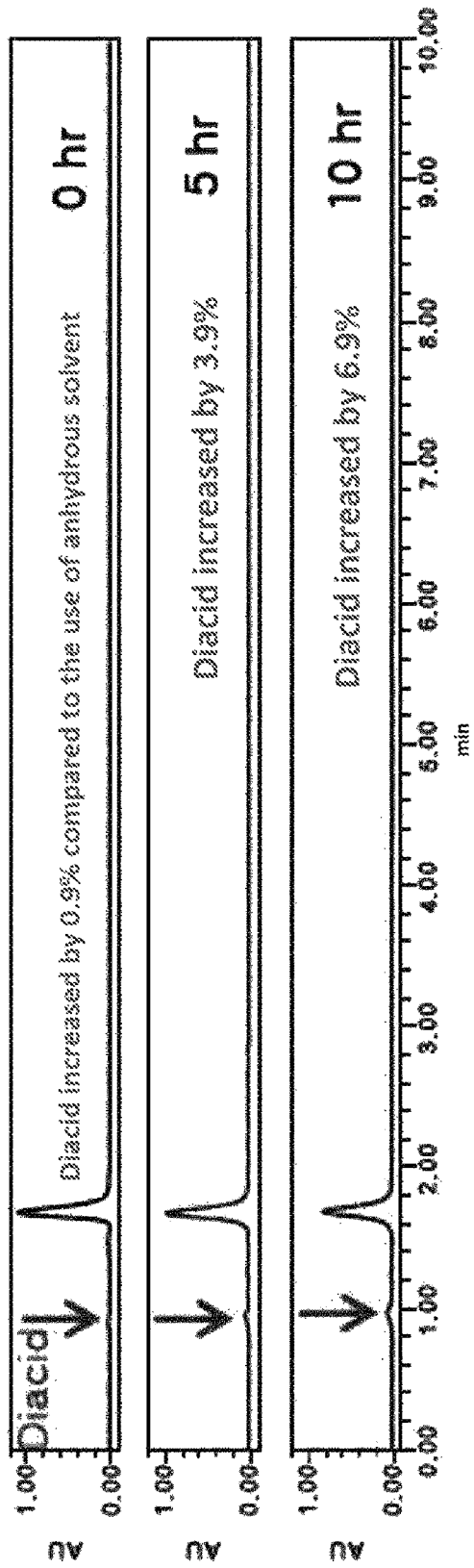

[Fig. 12]
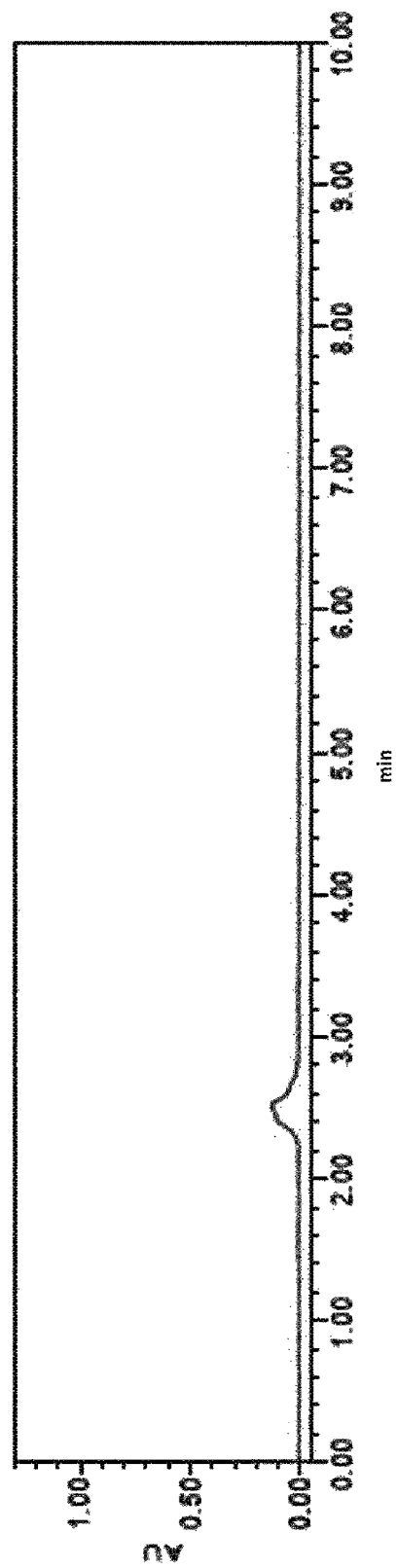

[Fig. 13]
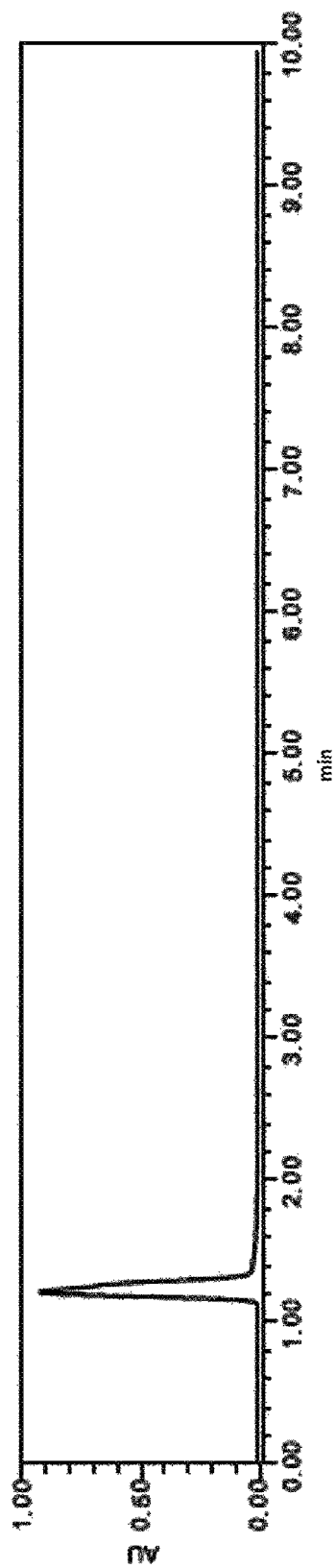

DIANHYDRIDE ANALYSIS METHOD

CROSS-REFERENCE TO RELATED APPLICATIONS

This application is a national phase entry under 35 U.S.C. § 371 of International Application No. PCT/KR2019/013062 filed Oct. 4, 2019, which claims priority from Korean Patent Application No. 10-2018-0119108 filed Oct. 5, 2018, all of which are incorporated herein by reference.

BACKGROUND OF THE INVENTION

1. Field of the Invention

The present invention relates to an analysis method for dianhydride.

2. Description of the Related Art

Dianhydride, which is one of highly reactive carboxylic acid derivatives, has a characteristic of easily reacting with water, alcohol, amine, etc. In the case that qualitative or quantitative analysis using conventional chromatographic methods is difficult to use due to the loss of original structure, such as ring opening reaction of chemical structure, a method such as titration is generally used for analysis of dianhydride. However, the titration method has difficulty in quantifying dianhydride, because titration endpoint is disturbed in case that the acid generated by interconversion of the dianhydride has high acidity. In addition, there are many analytical limitations, such as interfering with quantification of acid and base contained in the analyte.

Such conventional methods are difficult to determine accurate purity of dianhydride compounds, because the ring structure is opened due to the influence of external environment such as heat or moisture. Due to the planar structural properties of dianhydride compounds, there is a disadvantage that interaction with the column is low, so that the compounds do not sufficiently stay in the column.

Therefore, there is a need for a reliable assay for analyzing the purity of highly reactive dianhydrides.

SUMMARY OF THE INVENTION

It is an object of the present invention to provide a method for analyzing content of dianhydrides.

In order to achieve the above object, the present invention provides an analysis method for dianhydride, comprising the steps of:

adding an amine compound in excess of reaction equivalent to the dianhydride;

adding an anhydrous compound as a solvent to cause an anhydrous reaction; and quantifying the unreacted amine compound contained in the reactant after the anhydrous reaction.

In addition, the reactant may be analyzed by HPLC.

In addition, the method may comprise setting an amine standard to have three to ten concentrations in order to obtain a relationship between the concentration of the unreacted amine compound and the HPLC chromatogram peak area of the reactant.

In addition, the method may comprise calculating the amount of unreacted amine contained in the reactant from the relationship, and calculating the amount of amine participating in the reaction from the amount of unreacted amine.

In addition, the method may comprise calculating the amount of dianhydride participating in the reaction from the amount of amine participating in the reaction.

According to one embodiment, the amine compound may be aniline, naphthylamine or a combination thereof.

According to one embodiment, the anhydrous compound may be anhydrous N-methyl-2-pyrrolidone (NMP).

According to one embodiment, the standard solvent for setting the concentration of the amine compound may be at least one selected from the group consisting of anhydrous tetrahydrofuran (THF), anhydrous dimethyl formamide (DMF), anhydrous methanol, anhydrous benzene and anhydrous ether.

According to one embodiment, the molar ratio of the dianhydride and the amine compound may be 1:2 to 1:3.

According to one embodiment, the dianhydride may comprise at least one selected from the group consisting of 4,4'-biphthalic dianhydride (BPDA), pyromellitic dianhydride (PMDA), 1,3-dimethylcyclobutane-1,2,3,4-tetracarboxylic dianhydride (DMCBDA) and 1,2,3,4-butanetetracarboxylic dianhydride (BT-100).

According to one embodiment, the HPLC mobile phase may comprise at least one selected from the group consisting of acetonitrile (ACN), water, methanol and tetrahydrofuran.

According to one embodiment, the elution condition of the HPLC mobile phase may be a concentration gradient of 20% acetonitrile (ACN) and 80% water at 0 minute and 60% acetonitrile and 40% water at 20 minutes from the start of the analysis.

According to one embodiment, the HPLC column may be a silica column. Specifically, the silica column may be a carbon packed silica-based reversed phase column.

According to one embodiment, the method may comprise analyzing the chromatogram at 280 nm with a photodiode array (PDA).

According to other embodiment of the present invention, there is provided a system for applying the analysis method.

Other specific details of embodiments of the present invention are included in the following detailed description.

EFFECT OF THE INVENTION

The present invention can reliably analyze dianhydride having high reactivity and low solubility. In addition, it is possible to minimize a problem of disturbing analytical results due to the reaction product to improve accuracy.

BRIEF DESCRIPTION OF THE DRAWINGS

FIG. 1 is a graph showing the HPLC analysis results according to Example 1.

FIG. 2 is a graph showing a relationship between the concentration of the unreacted amine compound and the chromatogram peak area.

FIG. 3 shows the process of calculating the purity of the dianhydride according to the analysis outline according to Example 1.

FIG. 4 is a graph showing the HPLC analysis results according to Example 2.

FIG. 5 is a graph showing the HPLC analysis results according to Example 3.

FIG. 6 is a graph showing the HPLC analysis results according to Comparative Example 1.

FIG. 7 is a graph showing the HPLC analysis results according to Comparative Example 2.

FIG. 8 is a graph showing the HPLC analysis results according to Comparative Example 3.

FIG. 9 is a graph showing the HPLC analysis results according to Comparative Example 4.

FIG. 10 is a graph showing the HPLC analysis results according to Comparative Example 5.

FIG. 11 is a graph showing the HPLC analysis results according to Comparative Example 6.

FIG. 12 is a graph showing the HPLC analysis results according to Comparative Example 7.

FIG. 13 is a graph showing the HPLC analysis results according to Comparative Example 8.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The term "addition" as used herein may be described interchangeably with "feeding," "inflow," and "injection," and may be understood to mean flowing or putting solid, liquid, gas or heat, etc. into the places in a need thereof.

Hereinafter, the analysis method for dianhydride according to an embodiment of the present invention will be described in more detail.

In order to quantitatively identify highly reactive dianhydride and analyze purity thereof, a derivatization method based on amine reaction is introduced. It is possible to indirectly quantify dianhydride and analyze purity thereof by measuring the amount of unreacted amine compounds, after adding excess amine compounds to dianhydrides to convert to amide or imide forms.

Specifically, the present invention provides an analysis method for dianhydride, comprising the steps of:

adding an amine compound in excess of reaction equivalent to the dianhydride;

adding an anhydrous compound as a solvent to cause an anhydrous reaction; and quantifying the unreacted amine compound contained in the reactant after the anhydrous reaction.

According to one embodiment, in the step of the anhydrous reaction, all of water inside the flask may be removed by flame dry and any general method capable of removing the solvent and the moisture in the tool can be applied without limitation.

The unreacted amine compound included in the reactant can be analyzed by high performance liquid chromatography (HPLC). The HPLC mobile phase may comprise, for example, at least one selected from the group consisting of acetonitrile (ACN), water, methanol, and tetrahydrofuran. In addition, the elution condition may be a concentration gradient of 20% acetonitrile (ACN) and 80% water at 0 minute and 60% acetonitrile and 40% water at 20 minutes from the start of the analysis. As the HPLC column, a silica column may be used, and specifically, a carbon packed silica-based reversed phase column may be used, for example, C18 (4.6 mm ID×50 mm L, particle size: 3 μm) and the like may be used.

According to one embodiment, the chromatogram according to HPLC can be analyzed at a wavelength of 230 to 300 nm, for example at a wavelength of 280 nm by using a photodiode array (PDA).

According to one embodiment, an amine standard may be used to calculate the concentration of the unreacted amine compound contained in the reactant. The standard refers to a material that is a reference for analyzing components in a sample to determine content or concentration. For example, the amine standard can be set to have three to ten concentrations or three to five concentrations in order to determine concentrations of dianhydride and unreacted amine compound.

In addition, in order to calculate the amount of the unreacted amine contained in the reactant, the relationship between the concentration of the unreacted amine compound obtained from a standard material and the chromatogram peak area can be obtained. The amount of the unreacted amine contained in the reactant can be calculated from the relationship. The amount of the amine participating in the reaction can be calculated from the calculated amount of the unreacted amine. The amount of the dianhydride finally participating in the reaction can be calculated from the amount of the amine participating in the reaction.

According to one embodiment, the amine compound may be aniline or naphthylamine, for example aniline.

In addition, the amine standard may be an organic solvent for dissolving amine compounds, such as anhydrous tetrahydrofuran (THF), anhydrous dimethyl formamide, anhydrous methanol, anhydrous benzene, anhydrous ether, and the like, for example tetrahydrofuran may be used.

According to one embodiment, the dianhydride and the amine compound may have anhydrous reaction in the presence of an anhydrous compound solvent, and the anhydrous compound may be anhydrous N-methyl-2-pyrrolidone (NMP) or the like.

According to one embodiment, in the preparation of the HPLC analysis sample after anhydrous reaction, the anhydrous reactant may comprise at least one selected from the group consisting of anhydrous acetonitrile (ACN), anhydrous dimethyl formamide (DMF), anhydrous acetic acid, anhydrous acetone, anhydrous benzene, anhydrous carbon tetrachloride, anhydrous cyclohexane, anhydrous cyclopentane, anhydrous dichloroethane, anhydrous dichloromethane, anhydrous dimethyl sulfoxide, anhydrous dioxane, anhydrous ethyl acetate, anhydrous diethyl ether, anhydrous methanol, anhydrous methyl ethyl ketone and anhydrous tetrachloroethane, for example anhydrous DMF may be added.

According to one embodiment, in the step of adding the amine compound to the dianhydride, amine in excess of reaction equivalent should be added in order to indirectly quantify the dianhydride, for example 2.0 eq or more of amine may be added. For example, the molar ratio of dianhydride and amine compound may be 1:2 to 1:3, for example 1:2.1 to 1:2.5, for example 1:2.1 to 1:2.3.

Dianhydrides that can be analyzed in accordance with the present invention are not particularly limited and may include at least one selected from the group consisting of 4,4'-biphthalic dianhydride, pyromellitic dianhydride (PMDA), 1,3-dimethylcyclobutane-1,2,3,4-tetracarboxylic dianhydride (DMCBDA) and 1,2,3,4-butane tetracarboxylic dianhydride (BT-100).

As described above, the present invention relates to a method for indirect quantification and analysis of purity of dianhydrides by calculating the amount of amines by amine derivatization reaction of dianhydrides, which reversely utilizes the high reactivity of the dianhydride, and can use HPLC reverse phase column. In addition, the method is to quantify the dianhydride and analyze the purity thereof by measuring the dianhydride and the unreacted amine compound, thereby preventing the problem that the analysis result is disturbed due to the reaction product, i.e., amide or imide.

According to another embodiment of the present invention, the quantitative analysis and the purity analysis of the dianhydride can be easily performed by providing a system to which the above method is applied.

Hereinafter, embodiments of the present invention will be described in detail so that those skilled in the art can easily carry out the present invention. The present invention may, however, be embodied in many different forms and should not be construed as limited to the embodiments set forth herein.

EXAMPLE 1

1,2,3,4-butane tetracarboxylic dianhydride (BT-100)

Vacuum dry was carried out to remove moisture in a reactor before the compound was added. In a 250 ml round bottom flask, 1.0 g of BT-100, 1.02 g of fresh distilled aniline, and 21.89 g of anhydrous N-methyl-2-pyrrolidone (NMP) were added to perform amine derivatization reaction for 24 hours with stirring at 50° C. As a sample for high performance liquid chromatography (HPLC) analysis, 0.18 g of the reaction solution was prepared in 2 g of anhydrous dimethylformamide (DMF). The amine derivatization reaction of the BT-100 compound is shown in structural formula 1.

[Structural formula 1]

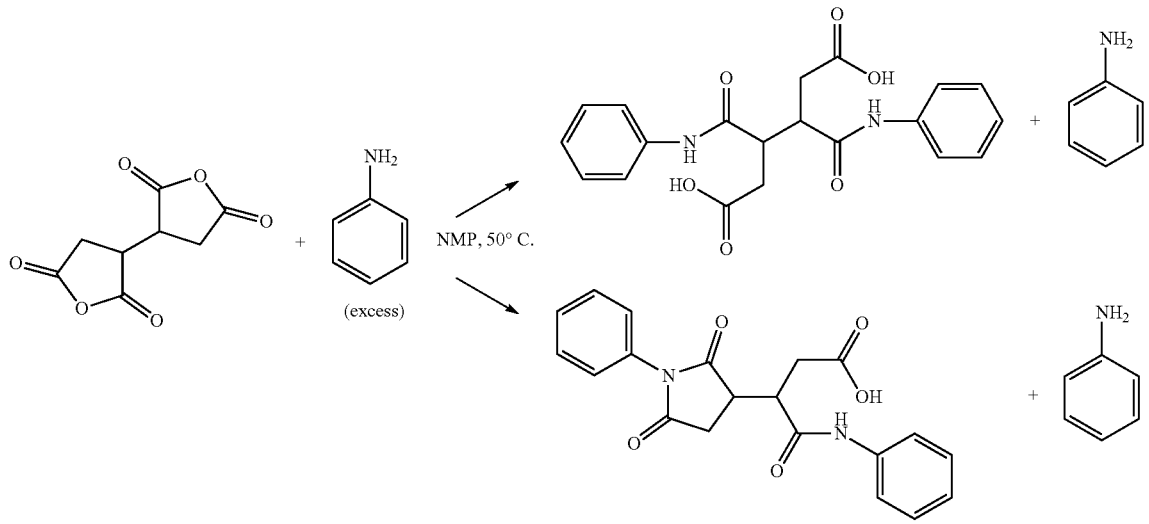

HPLC analysis was performed using HPLC system of Waters (e2695 separations module, 2998 photodiode array detector). As an HPLC column, Capcellpak C18 (4.6 mm ID×50 mm L, particle size: 3 μm) of Shiseido was used at 40° C. The mobile phase was acetonitrile (ACN, HPLC grade, J. T. Baker) and ultra purified water (MILLIPORE, Mili-Q, 18.2 MΩ), which are degassed, and a gradient condition was ACN/H$_2$O from 20/80 (v/v) to 60/40 (v/v) for 20 minutes at 1 mL/min. The analytical sample was injected with 10 μL, and the chromatogram was obtained at 280 nm using a photodiode array detector (PDA). The results are shown in FIG. 1.

As an aniline standard solution, tetrahydrofuran (THF) was selected to have three concentrations of 0.5, 0.1 and 0.05 mg/mL to confirm the concentration of unreacted aniline in the reaction. The relationship between the concentration of unreacted aniline and the chromatogram peak area is shown in FIG. 2. From the relationship in FIG. 2, the concentration (mg/ml) of unreacted aniline was converted to a mass value using a density value (0.944 g/ml).

The process of calculating purity of the dianhydride according to the analysis outline according to Example 1 is shown in FIG. 3.

The final calculated purity of BT-100 was 94.8%.

EXAMPLE 2

1,3-dimethyl cyclobutane-1,2,3,4-tetracarboxylic dianhydride (DMCBDA)

Vacuum dry was carried out to remove moisture in a reactor before the compound was added. In a 250 ml round bottom flask, 1.13 g of DMCBDA, 1.11 g of fresh distilled aniline, and 10.76 g of anhydrous N-methyl-2-pyrrolidone (NMP) were added to perform amine derivatization reaction for 24 hours with stirring at 50° C. As a sample for high performance liquid chromatography (HPLC) analysis, 0.0684 g of the reaction solution was prepared in 2.0067 g of anhydrous dimethylformamide (DMF).

The amine derivatization reaction of the DMCBDA compound is shown in structural formula 2.

[Structural formula 2]

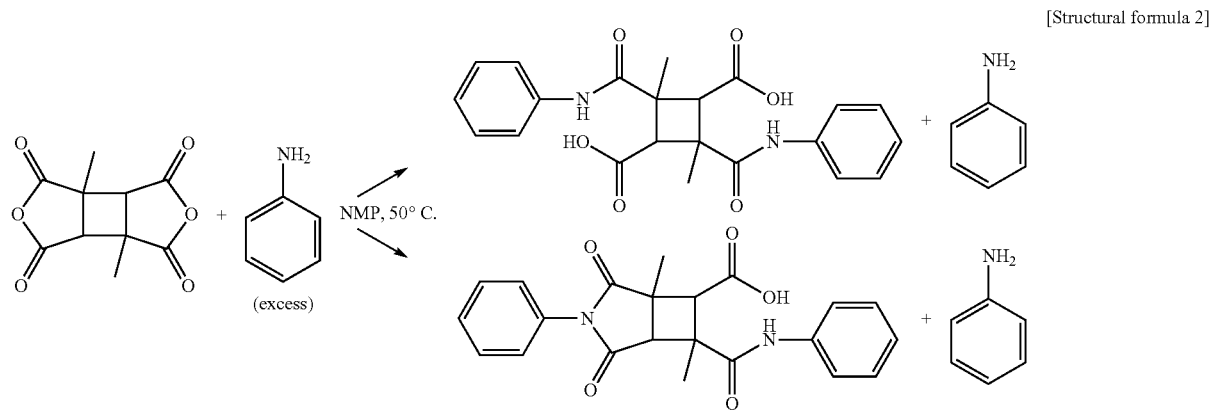

HPLC analysis and calculation of purity were carried out in the same manner as in Example 1, the HPLC analysis results are shown in FIG. 4.

As a result, the purity of DMCBDA was found to be 94.6%.

EXAMPLE 3

4,4'-biphthalic dianhydride (BPDA)

Vacuum dry was carried out to remove moisture in a reactor before the compound was added. In a 250 ml round bottom flask, 1.47 g of BPDA, 1.13 g of fresh distilled aniline, and 11.05 g of anhydrous N-methyl-2-pyrrolidone (NMP) were added to perform amine derivatization reaction for 24 hours with stirring at 50° C. As a sample for high performance liquid chromatography (HPLC) analysis, 0.0799 g of the reaction solution was prepared in 2.0031 g of anhydrous dimethylformamide (DMF).

The amine derivatization reaction of the BPDA compound is shown in structural formula 3.

[Structural formula 3]

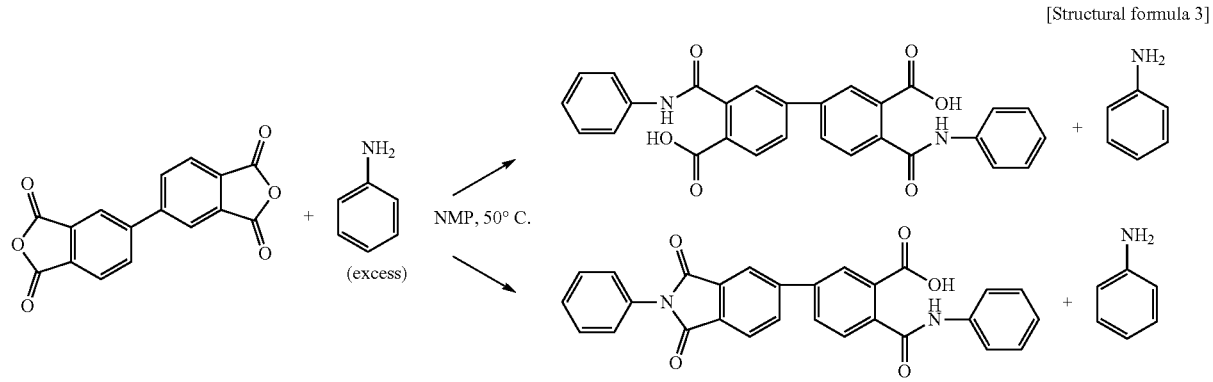

HPLC analysis and calculation of purity were carried out in the same manner as in Example 1, the HPLC analysis results are shown in FIG. 5.

As a result, the purity of DMCBDA was found to be 99.6%.

Specifically, the constant values used in the analysis of the dianhydride content of Examples 1 to 3 are summarized in Table 1 and the calculation process is summarized in Table 2.

TABLE 1

|  | BT-100 | DMCBDA | BPDA |
|---|---|---|---|
| Molecular weight of dianhydride (g/mol) | 198.13 | 224.17 | 294.22 |
| Aniline peak area | 3695504 | 4660764 | 4735326 |
| Initial injection of aniline (mg) | 1020 | 1110 | 1130 |
| Initial injection of dianhydride (g) | 1.00 | 1.13 | 1.47 |
| Total reaction solution (g) | 23.91 | 13.00 | 13.65 |
| Reaction solution in the analytic sample (mg) | 180.00 | 68.40 | 79.90 |
| Analytic sample (g) | 2.18 | 2.08 | 2.08 |

TABLE 2

| No. | Calculation process | BT-100 | DMCBDA | BPDA |
|---|---|---|---|---|
| (1) | Concentration of aniline in the analytic sample (mg/mL) Substituting aniline peak area into the relationship of FIG. 2 (y = 1.155 * $10^{-7}$ * x − 0.007887) | 0.42 | 0.53 | 0.54 |
| (2) | Aniline in the analytic sample (mg) (1)*(weight of the analytic sample*1000)/(density of DMF (944 mg/ml)) | 0.97 | 1.17 | 1.19 |
| (3) | Aniline in the reaction solution (mg) (weight of total reaction solution*1000)*(2)/ (weight of reaction solution in the analytic sample) | 128.51 | 221.61 | 203.03 |
| (4) | Aniline participating in the reaction (mg) (initial injection of aniline) − (3) | 891.49 | 888.39 | 926.97 |
| (5) | Mol of aniline participating in the reaction (mol) (4)/1000/(molecular weight of aniline (93.13 g/mol)) | $9.57*10^{-3}$ | $9.54*10^{-3}$ | $9.95*10^{-3}$ |
| (6) | Mol of dianhydride participating in the reaction (mol) (5)/2 | $4.79*10^{-3}$ | $4.77*10^{-3}$ | $4.98*10^{-3}$ |
| (7) | Dianhydride participating in the reaction (mg) (6)*(molecular weight of dianhydride)*1000 | 948.30 | 1069.21 | 1464.27 |
| (8) | Purity of dianhydride (%) (7)/(initial injection of dianhydride*1000)*100 | 94.83 | 94.62 | 99.61 |

COMPARATIVE EXAMPLE 1

Indirect Quantification of 1,2,3,4-butane tetracarboxylic dianhydride (BT-100)

A reaction solvent for BT-100 was non-anhydrous N-methyl pyrrolidone (NMP) and a mobile phase of HPLC analysis was anhydrous acetonitrile (ACN, anhydrous, Sigma Aldrich) and ultra purified water (MILLIPORE, Mili-Q, 18.2 MΩ), which are degassed, and a gradient condition is ACN/$H_2O$ from 5/95 (v/v) to 100/0 (v/v) for 10 minutes. The chromatogram was obtained at 203 nm using a photodiode array detector (PDA). The procedure was the same as in Example 1 except for the above. The results are shown in FIG. 6.

As shown in FIG. 6, in the analytical conditions of Comparative Example 1, the aniline has too short retention time and the peak thereof is overlapped with the solvent peak, which indicates that it is not suitable for purity analysis.

COMPARATIVE EXAMPLE 2

Indirect Quantification of 1,2,3,4-butane tetracarboxylic dianhydride (BT-100)

Salts were added to the mobile phase in order to verify the change with HPLC conditions. Specifically, a mobile phase of HPLC was ACN (trifluoroacetic acid, TFA 0.1%)/$H_2O$ (TFA 0.1%). The chromatogram was obtained at 203 nm using a 3100 mass detector. The procedure was the same as in Example 1 except for the above. The mode of the mass detector is ES+ mode and the conditions are as follows: Capillary 3 kV, ES Cone 30V, Source temperature 150° C., Desolvation temperature 350° C., Cone gas flow 60 L/hr, and Desolvation gas flow 600 L/hr. The results are shown in FIG. 7.

As shown in FIG. 7, in the conditions of Comparative Example 2, the aniline peak was not detected, which indicates that it is not suitable for an indirect quantitative method for aniline.

COMPARATIVE EXAMPLE 3

Indirect Quantification of 1,3-dimethyl cyclobutane-1,2,3,4-tetracarboxylic dianhydride (DMCBDA)

HPLC analysis and detection were carried out in the same manner as in Comparative Example 2, and the results are shown in FIG. 8.

As shown in FIG. 8, in the conditions of Comparative Example 3, the aniline peak was not detected, which indicates that it is not suitable for an indirect quantitative method for aniline.

COMPARATIVE EXAMPLE 4

Indirect Quantification of 4,4'-biphthalic dianhydride (BPDA)

HPLC analysis and detection were carried out in the same manner as in Comparative Example 2, and the results are shown in FIG. 9.

As shown in FIG. 9, in the conditions of Comparative Example 4, the aniline peak was not detected, which indicates that it is not suitable for an indirect quantitative method for aniline.

COMPARATIVE EXAMPLE 5

Direct Analysis of 4,4'-biphthalic dianhydride (BPDA)

An HPLC mobile phase was acetonitrile (ACN, HPLC grade, Sigma Aldrich) and dimethylformamide (DMF, HPLC grade, Sigma Aldrich) and the sample was completely dissolved in DMF (H PLC grade) at a concentration of 1 mg/mL. Then, the measurement was carried out in the same manner as in Example 1 except for injecting with 2 μL into the column to obtain a chromatogram. The results are shown in FIG. 10.

As shown in FIG. 10, it is impossible to analyze the purity of dianhydride under HPLC analysis conditions of Comparative Example 6 using DMF instead of water. It was found that the original structure of dianhydride is broken when water is used instead of DMF in the direct analysis method of BPDA.

COMPARATIVE EXAMPLE 6

Direct Analysis of 4,4'-biphthalic dianhydride (BPDA)

An HPLC column was capcellpak cyano (4.6 mm ID×150 mm L, particle size: 3 μm) of Shiseido and a mobile phase was ACN (HPLC grade, J.T. Baker) and DMF (HPLC grade, Thermos fisher) and the sample was completely dissolved in DMF at a concentration of 1 mg/mL. Then, the measurement was carried out in the same manner as in Example 1 except for injecting with 10 μL.

The results are shown in FIG. 11. As shown in FIG. 11, it can be confirmed that as the experimental time increases, the amount of diacids increases, compared to use of anhydrous solvent, due to the influence of water present in a minor amount in the solvent for HPLC. Therefore, it was found that the use of general solvent of HPLC grade as eluent is not appropriate.

COMPARATIVE EXAMPLE 7

Direct Analysis of 4,4'-biphthalic dianhydride (BPDA)

The measurement was carried out in the same manner as in Comparative Example 5 except that an HPLC column was acclaim surfactant (4.6 mm ID×150 mm L, particle size: 5 μm) of Thermo fisher and a mobile phase was anhydrous ACN (anhydrous, Sigma Aldrich) and anhydrous DMF (anhydrous, Sigma Aldrich).

The results are shown in FIG. 12. As shown in FIG. 12, it was found that it is impossible to analyze the purity of dianhydride under the conditions using the acclaim surfactant column.

COMPARATIVE EXAMPLE 8

Direct Analysis of 4,4'-biphthalic dianhydride (BPDA)

The measurement was carried out in the same manner as in Comparative Example 5 except that an HPLC column was capcellpak cyano (4.6 mm ID×150 mm L, particle size: 3 μm) of Shiseido and a mobile phase was chloroform (HPLC grade, J.T. Baker) and DMF (HPLC grade, Thermo fisher), which are degassed, and a gradient condition was chloroform/DMF of 90/10 (v/v) for 10 minutes at 1.0 mL/min.

The results are shown in FIG. 13. As shown in FIG. 13, it was found that it is impossible to analyze the purity of dianhydride under the conditions using the chloroform (HPLC grade, J.T. Baker) as a mobile phase and the capcellpak cyano (4.6 mm ID×150 mm L, particle size: 3 μm) of Shiseido.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. An analysis method for dianhydride, comprising the steps of:
   adding an amine compound in excess of reaction equivalent to a dianhydride to obtain a reactant;
   adding an anhydrous compound as a solvent to cause an anhydrous reaction; and
   quantifying an unreacted amine compound contained in the reactant after the anhydrous reaction.

2. The analysis method for dianhydride according to claim 1, wherein the method comprises analyzing the reactant by HPLC.

3. The analysis method for dianhydride according to claim 2, wherein the method comprises setting an amine standard to have three to ten concentrations in order to obtain a relationship between a concentration of the unreacted amine compound and a HPLC chromatogram peak area of the reactant.

4. The analysis method for dianhydride according to claim 3, wherein the method comprises calculating the amount of the unreacted amine compound contained in the reactant from the relationship.

5. The analysis method for dianhydride according to claim 4, wherein the method comprises calculating the amount of the amine compound participating in the anhydrous reaction from the amount of the unreacted amine.

6. The analysis method for dianhydride according to claim 5, wherein the method comprises calculating the amount of the dianhydride participating in the anhydrous reaction from the amount of the amine compound participating in the reaction.

7. The analysis method for dianhydride according to claim 1, wherein the amine compound is aniline, naphthylamine or a combination thereof.

8. The analysis method for dianhydride according to claim 1, wherein the anhydrous compound is anhydrous N-methyl-2-pyrrolidone (NMP).

9. The analysis method for dianhydride according to claim 3, wherein the standard solvent for setting the concentration of the amine compound is at least one selected from the group consisting of anhydrous tetrahydrofuran (THF), anhydrous dimethyl formamide (DMF), anhydrous methanol, anhydrous benzene and anhydrous ether.

10. The analysis method for dianhydride according to claim 7, wherein a molar ratio of the dianhydride and the amine compound is 1: 2 to 1: 3.

11. The analysis method for dianhydride according to claim 1, wherein the dianhydride comprises at least one selected from the group consisting of 4,4'-biphthalic dianhydride (BPDA), pyromellitic dianhydride (PMDA), 1,3-dimethylcyclobutane-1,2,3,4-tetracarboxylic dianhydride (DMCBDA) and 1,2,3,4-butanetetracarboxylic dianhydride (BT-100).

12. The analysis method for dianhydride according to claim 2, wherein a mobile phase for the HPLC comprises at least one selected from the group consisting of acetonitrile (ACN), water, methanol and tetrahydrofuran.

13. The analysis method for dianhydride according to claim 2, wherein an elution condition of the mobile phase for the HPLC is a concentration gradient of 20% acetonitrile (ACN) and 80% water at 0 minute and 60% acetonitrile and 40% water at 20 minutes from the start of the analysis.

14. The analysis method for dianhydride according to claim 2, wherein a column for the HPLC is a silica column.

15. The analysis method for dianhydride according to claim 14, wherein the silica column is a carbon packed silica-based reversed phase column.

16. The analysis method for dianhydride according to claim 2, wherein the method comprises analyzing chromatogram at 280 nm with a photodiode array (PDA).

17. A system for applying the analysis method according to claims 1.

18. The analysis method for dianhydride according to claim 2, wherein the method comprises analyzing chromatogram at 230 to 300 nm with a photodiode array (PDA).

19. The analysis method for dianhydride according to claim 1, wherein after the anhydrous reaction, the method comprises preparing an analysis sample by using at least one selected from the group consisting of anhydrous acetonitrile (ACN), anhydrous dimethyl formamide (DMF), anhydrous acetic acid, anhydrous acetone, anhydrous benzene, anhydrous carbon tetrachloride, anhydrous cyclohexane, anhydrous cyclopentane, anhydrous dichloroethane, anhydrous dichloromethane, anhydrous dimethyl sulfoxide, anhydrous dioxane, anhydrous ethyl acetate, anhydrous diethyl ether, anhydrous methanol, anhydrous methyl ethyl ketone and anhydrous tetrachloroethane.

* * * * *